(12) United States Patent
Nagatomo et al.

(10) Patent No.: US 12,535,315 B2
(45) Date of Patent: Jan. 27, 2026

(54) OPTICAL DEVICE AND OPTICAL MEASUREMENT METHOD

(71) Applicant: Samsung Electronics Co., Ltd., Suwon-si (KR)

(72) Inventors: Daisuke Nagatomo, Yokohama (JP);
Shinji Ueyama, Yokohama (JP);
Takamasa Sugiura, Yokohama (JP);
Euisun Choi, Suwon-si (KR);
Fumitaka Moroishi, Yokohama (JP);
Masanori Izumita, Yokohama (JP);
Takahiro Tokumiya, Yokohama (JP);
Tatsuya Ishimoto, Yokohama (JP);
Masato Kajinami, Yokohama (JP)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 238 days.

(21) Appl. No.: 18/527,700

(22) Filed: Dec. 4, 2023

(65) Prior Publication Data

US 2024/0183657 A1  Jun. 6, 2024

(30) Foreign Application Priority Data

Dec. 5, 2022 (JP) .................... 2022-194088
Jun. 16, 2023 (KR) .............. 10-2023-0077714

(51) Int. Cl.
*G01B 11/30* (2006.01)

(52) U.S. Cl.
CPC .......... *G01B 11/303* (2013.01); *G01B 11/306* (2013.01)

(58) Field of Classification Search
CPC ........................ G01B 11/303; G01B 11/306
(Continued)

(56) References Cited

U.S. PATENT DOCUMENTS 6,563,567 B1 * 5/2003 Komatsuda ......... G03F 7/70108
355/71
7,456,967 B2 * 11/2008 Fukui .................... G03F 9/7088
356/401

(Continued)

FOREIGN PATENT DOCUMENTS

JP         2001-60605 A    3/2001
JP         4596422 B2      12/2010
(Continued)

*Primary Examiner* — Isiaka O Akanbi
(74) *Attorney, Agent, or Firm* — Harness, Dickey & Pierce, P.L.C.

(57) ABSTRACT

An optical device includes a monochromatic light source, a light distribution switching portion configured to transmit monochromatic light emitted from the monochromatic light source in one fan-shaped region among a plurality of fan-shaped regions centered on a central optical axis and block the monochromatic light in other fan-shaped regions, an objective lens, an aperture stop configured to collect reflected light from the object, an imaging lens, which has passed through the aperture stop, a light receiver on an imaging plane formed by the imaging lens and configured to receive the reflected light from the object and photoelectrically convert the received reflected light, and a controller configured to instruct the light distribution switching portion to change a region transmitting light over time, and calculate a normal direction of the object based on an electrical signal photoelectrically converted by the light receiver.

20 Claims, 15 Drawing Sheets

(58) Field of Classification Search
USPC .......... 356/237.2–237.6, 612–624, 399–401
See application file for complete search history.

(56) References Cited

U.S. PATENT DOCUMENTS

| | | | | |
|---|---|---|---|---|
| 7,535,562 | B2* | 5/2009 | Matsui | G01N 21/8806 |
| | | | | 356/237.5 |
| 10,656,541 | B2* | 5/2020 | Maeda | G03F 7/70483 |
| 10,983,445 | B2* | 4/2021 | Pandey | G03F 7/70625 |
| 11,231,573 | B2* | 1/2022 | Fujishima | G03F 9/7088 |
| 2007/0121106 | A1* | 5/2007 | Shibata | G01N 21/8806 |
| | | | | 356/237.2 |
| 2009/0147247 | A1* | 6/2009 | Endo | G01N 21/956 |
| | | | | 356/237.2 |
| 2009/0177428 | A1 | 7/2009 | Iden | |
| 2013/0114880 | A1* | 5/2013 | Matsumoto | G01N 21/956 |
| | | | | 382/149 |
| 2013/0321797 | A1 | 12/2013 | Cavan et al. | |
| 2016/0040985 | A1* | 2/2016 | Nagai | G01J 3/2823 |
| | | | | 356/600 |
| 2016/0079199 | A1 | 3/2016 | Seok et al. | |
| 2018/0299386 | A1 | 10/2018 | Masumura | |
| 2020/0158657 | A1 | 5/2020 | Masumura | |
| 2023/0213748 | A1* | 7/2023 | Masumura | G02B 13/22 |
| | | | | 359/372 |
| 2023/0375463 | A1* | 11/2023 | Jeong | G01N 21/956 |

FOREIGN PATENT DOCUMENTS

| | | |
|---|---|---|
| JP | 4597946 B2 | 12/2010 |
| JP | 2011-33552 A | 2/2011 |
| JP | 2015-521291 A | 7/2015 |
| JP | 5866586 B1 | 2/2016 |
| JP | 2018-055083 A | 4/2018 |
| JP | 6407827 B2 | 10/2018 |
| JP | 6451821 B1 | 1/2019 |

* cited by examiner

OPTICAL DEVICE AND OPTICAL MEASUREMENT METHOD

CROSS-REFERENCE TO RELATED APPLICATION

This application is based on and claims priority under 35 U.S.C. § 119 to Japanese Patent Application No. 2022-194088, filed on Dec. 5, 2022, in the Japan Patent Office, and Korean Patent Application No. 10-2023-0077714, filed on Jun. 16, 2023, in the Korean Intellectual Property Office, the disclosures of which are incorporated by reference herein in their entireties.

BACKGROUND

The inventive concepts relate to optical devices and optical measurement methods.

Multilayering of semiconductor devices is in progress for the purpose of improving driving speeds and reducing power consumption. In addition, as a result of requiring multilayering while maintaining the thickness of the final product, thinning per semiconductor layer to be stacked is also in progress. For example, in high bandwidth memory (HBM) in which dynamic random access memory (DRAM) dies are stacked by using through silicon via (TSV) electrodes, when 12 layers are stacked within a thickness of 720 μm, the thickness per layer is 50 μm or less.

In system in package (SiP) technology that integrates dies having multiple functions into a single package, multilayering is also in progress. Three-dimensional (3D) packaging using TSV electrodes has not been put into practical use mainly due to cost issues, but a packaging method in which multilayered memories or logic integrated circuits (ICs) are placed in a horizontal plane on an interposer and connected to each other with micro bumps has been put into practical use. As a material of the interposer, in addition to silicon (Si) capable of high-density wiring, glass, resin, and organic material substrate are under development. The interposer has a large area (such as 10 mm, or tens of mm) and a small thickness of about 100 μm, compared to the die.

In general, when device components such as a semiconductor device or an interposer are thinned below about 100 μm, it is a big issue to secure flatness. When the flatness deteriorates, stacked device connection portions are damaged or voids occur at a bonding interface, resulting in a decrease in packaging strength and a deterioration in reliability of products. The main cause of deterioration in flatness is the mismatch of the thermal expansion coefficient of Si that is the main material of semiconductors, and metals such as Al and Cu constituting electronic circuits, or encapsulants such as epoxy resin.

In the process of stacking thinned device components, shape control for flatness inspection and flatness maintenance is important.

As disclosed in Patent Literature 1, as a method of measuring flatness of a device component at high speed and high precision, there may be an inspection system using special illumination. When a workpiece is bent and a surface normal at a certain point is tilted with respect to an optical axis of an observation optical system, an inclusion relationship between a solid angle of object light reflected from the workpiece and a solid angle hit by the observation optical system (numerical aperture (NA)) changes, and thus, a region shaded by an aperture stop changes. As a result, a light flux attribute ratio of a converging point on a camera changes. For example, the light flux attribute of the converging point on the camera changes color by changing a ratio of red, blue, and green. A normal inclination angle of a corresponding point on the workpiece is obtained from the amount of change. A normal angle of each point on the workpiece corresponding to each pixel of the camera is calculated, and a 3D shape of the workpiece surface is restored based on the normal angle. Japanese Unexamined Patent Publication No. 2019-100930 may correspond to Patent Literature 1.

In the device of Patent Literature 1, an illumination device calculates the shape of a surface from a ratio of red, blue, and green. Accordingly, wrong results are obtained for workpieces in which spectral reflectance is extremely different in plane. Because semiconductors form a metal circuit on a Si substrate and spectral reflectance is not equal, accurate measurement is difficult.

SUMMARY

The objectives of the inventive concepts are not limited to those described below, and other objectives that are not mentioned herein will be clearly understood from the following description by those of ordinary skill in the art.

An optical device according to some example embodiments includes a monochromatic light source, a light distribution switching portion configured to transmit monochromatic light emitted from the monochromatic light source in one fan-shaped region among a plurality of fan-shaped regions centered on a central optical axis and block the monochromatic light in other fan-shaped regions of the plurality of fan-shaped regions, an objective lens configured to condense the light passing through the light distribution switching portion onto an object, an aperture stop configured to collect reflected light from the object, an imaging lens configured to condense the reflected light from the object, the reflected light having passed through the aperture stop, a light receiver on an imaging plane formed by the imaging lens and configured to receive the reflected light from the object and photoelectrically convert the received reflected light, and a controller configured to instruct the light distribution switching portion to change a region transmitting light over time, and calculate a normal direction of the object based on an electrical signal photoelectrically converted by the light receiver.

An optical measurement method according to some example embodiments includes transmitting monochromatic light from a central optical axis in one fan-shaped region among a plurality of fan-shaped regions and blocking light in other fan-shaped regions of the plurality of fan-shaped regions, condensing the monochromatic light transmitted through the fan-shaped region onto an object, collecting reflected light from the object, forming an image of the reflected light, photoelectrically converting the reflected light, changing the one fan-shaped region transmitting the monochromatic light over time, and calculating a normal direction of the object based on an electrical signal obtained by photoelectrically converting the reflected light.

BRIEF DESCRIPTION OF THE DRAWINGS

Example embodiments will be more clearly understood from the following detailed description taken in conjunction with the accompanying drawings in which.

DETAILED DESCRIPTION

Figure 1:
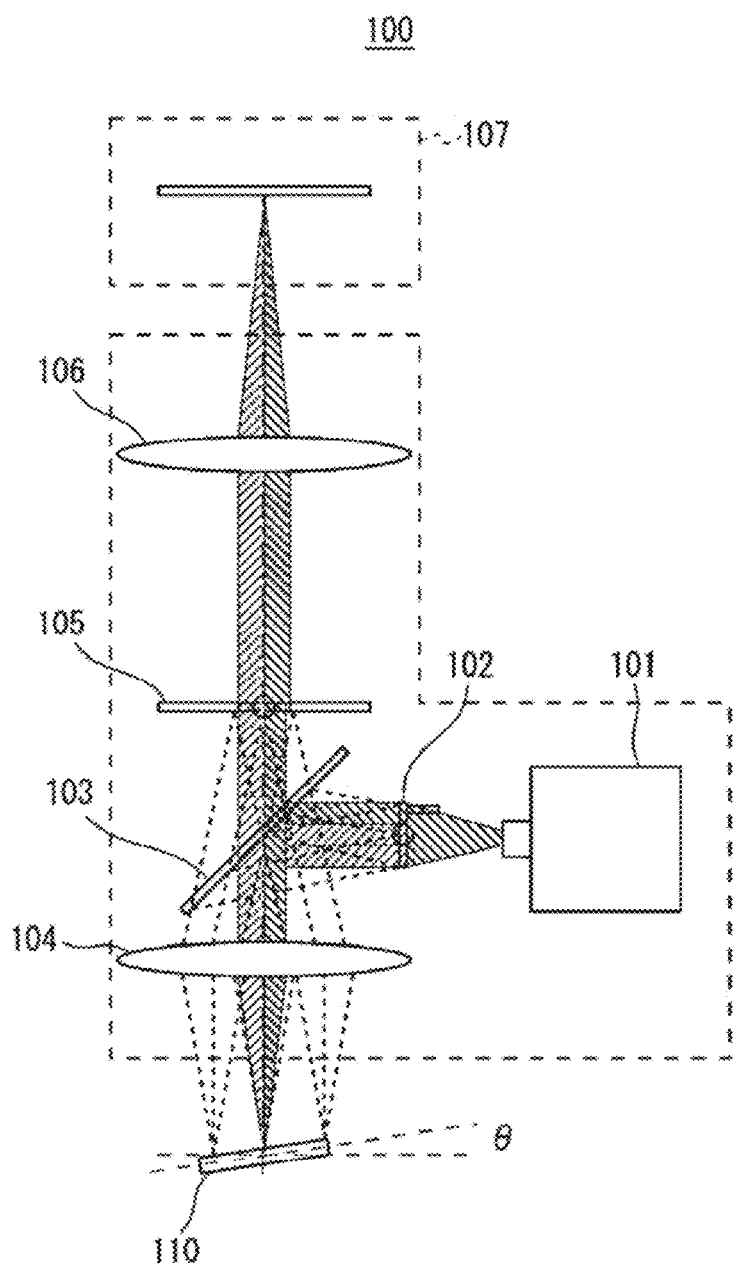
FIG. 1 is a cross-sectional view illustrating an optical device according to some example embodiments.

Hereinafter, example embodiments will be described in detail with reference to the accompanying drawings. The same elements in the drawings are denoted by the same reference numerals, and redundant descriptions thereof are omitted.

FIG. 1 is a cross-sectional view illustrating an optical device 100 according to some example embodiments.

Referring to FIG. 1, the optical device 100 may include a monochromatic light source 101, a light distribution switching portion 102, a half mirror 103, an objective lens 104, an aperture stop 105, an imaging lens 106, a light receiver 107, and a controller (not shown).

The monochromatic light source 101 may be monochromatic illumination. The monochromatic light source 101 may uniformly emit light to the entire effective area of the light distribution switching portion 102. Although a case where the optical device 100 according to some example embodiments uses a green light-emitting diode (LED) light source has been described, the inventive concepts are not limited thereto, and the optical device 100 may use a light source of another wavelength that is capable of conversion into a suitable wavelength according to spectral reflectance of a workpiece 110.

A surface of the light distribution switching portion 102 on which light from the monochromatic light source 101 hits may be divided into a plurality of regions. Whether to transmit, reflect, or block light with respect to each region may be switched according to time. The regions are regions in which a circle is divided into a fan shape around a central optical axis. The light distribution switching portion 102 may transmit light in each region and may reflect or block light in the other regions. The light distribution switching portion 102 may switch a region transmitting the light according to time. For example, the light distribution switching portion 102 may switch to light transmission or light blocking through a mechanism that rotates a fan-shaped opening. Alternatively, or additionally, the light distribution switching portion 102 may switch to light transmission or light blocking through a transmissive liquid crystal. Alternatively, or additionally, the light distribution switching portion 102 may switch to light transmission or light blocking by using a digital mirror device (DMD) or liquid crystal on silicon (LCOS).

The half mirror 103 may be a beam splitter installed between the objective lens 104 and the imaging lens 106 and configured to join an optical axis of an illumination optical system and an optical axis of an observation optical system to each other. In the optical device 100 according to some example embodiments, the optical axis of the observation optical system and the optical axis of the illumination optical system may be arranged to form a right angle, and the half mirror 103 may be arranged at an intersection of the optical axis of the observation optical system and the optical axis of the illumination optical system. The half mirror 103 may reflect the monochromatic light from the light distribution switching portion 102 toward the objective lens 104. The half mirror 103 may transmit the reflected light arriving from the objective lens 104 toward the aperture stop 105.

The objective lens 104 may condense the light reflected by the half mirror 103 onto the workpiece 110. The objective lens 104 may form an image of the workpiece 110 on the light receiver 107 in combination with the imaging lens 106. Because the optical device 100 according to some example embodiments has an arrangement of an infinity-corrected optical system, the workpiece 110 may be arranged near a rear focal point of the objective lens 104, and thus, light from one point on the workpiece 110 may become approximately parallel light after passing through the objective lens 104.

The aperture stop 105 may be a flat plate having a hole centered on the central optical axis, and the aperture stop 105 may collect reflected light. The aperture stop 105 may set the numerical aperture (NA) of the objective lens 104. That is, the aperture stop 105 may be arranged at the front focal position of the objective lens 104 and configured to define the NA of the objective lens 104.

The imaging lens 106 may be combined with the objective lens 104 so that light emitted from one point on the workpiece 110 is condensed onto the light receiver 107.

The light receiver 107 may receive light and simultaneously (for example, at or about the same time) convert the light into an electrical signal in units of divided elements. For example, the light receiver 107 may include a two-dimensional (2D) image sensor, such as a complementary metal-oxide-semiconductor (CMOS) image sensor or a charge-coupled device (CCD) image sensor. In the present specification, a case where the light receiver 107 is a CMOS monochrome camera has been described as an example, but the inventive concepts are not limited thereto.

The controller may control a region that allows light to be transmitted through the light distribution switching portion 102 and may calculate a normal angle of a point on the workpiece 110 based on a signal from the light receiver 107. For example, the controller may be configured as a computer. With the above configuration, the optical device 100 according to some example embodiments may calculate a normal angle of a point on the workpiece 110.

Figure 2:
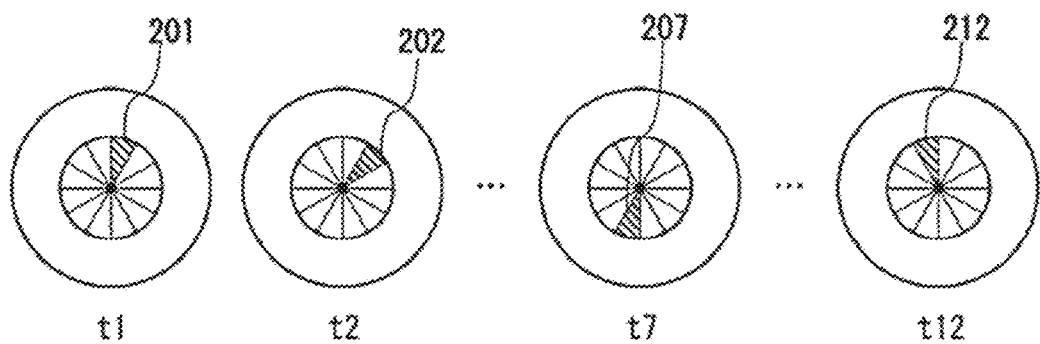
FIG. 2 is a diagram illustrating an example of light distribution switching of a light distribution switching portion.

FIG. 2 is a diagram illustrating an example of light distribution switching of the light distribution switching portion 102 in the optical device 100 according to some example embodiments. The operation of the light distribution switching portion 102 and the principle of calculating the normal angle will be described. In the optical device 100 according to some example embodiments, the region may be divided into 12 equal parts by about or exactly 30° in a circumferential direction with respect to the central optical axis through a boundary line.

Referring to FIG. 2, the light distribution switching portion 102 may transmit monochromatic light in a specific region at a specific time. The time may be divided into first to twelfth times t1 to t12, and the light distribution switching portion 102 may be divided into first to twelfth regions 201 to 212, which are regions that transmit monochromatic light in units of about or exactly 30° in the circumferential direction. The first to twelfth regions 201 to 212 may have a fan-shape. The light distribution switching portion 102 may transmit monochromatic light in the first region 201 at the first time t1. Similarly, the light distribution switching portion 102 may transmit monochromatic light in the second region 202 at the second time t2. Similarly, the light distribution switching portion 102 may transmit monochromatic light in the third to sixth regions corresponding to the third to sixth times, respectively. The light distribution switching portion 102 may transmit monochromatic light in the seventh region 207 at the seventh time t7. The light distribution switching portion 102 may transmit monochromatic light in the twelfth region 212 at the twelfth time t12. As described above, the light distribution switching portion 102 may change the region transmitting monochromatic light in units of about or exactly 30° in the circumferential direction. For example, one or more regions may correspond to the light distribution switching portion 102 at a time. In some example embodiments, the light distribution switching portion 102 may correspond to the first region at the first time, the second region at the second time, etc., in a synchronized manner, and in some example embodiments, the light distribution switching portion 102 may correspond to the third region at the first time, the sixth region at the second time, etc., in an unsynchronized manner.

Figure 3:
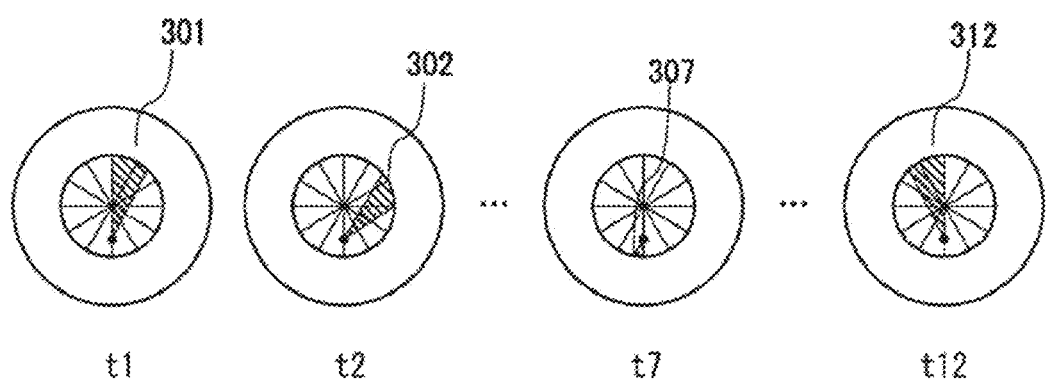
FIG. 3 is a diagram illustrating an example of reflected light in an aperture stop.

FIG. 3 is a diagram illustrating an example of reflected light in the aperture stop 105. Referring to FIG. 3, when the surface of the workpiece 110 is not perpendicular to the central optical axis from the objective lens 104, reflected light is tilted with respect to the central optical axis. As a result, even the monochromatic light passing through the aperture stop 105 may deviate from the central optical axis, resulting in a distorted fan-shaped region.

As illustrated in FIG. 3, reflected light at the first time t1 may be in a first range 301. Reflected light at the second time t2 may be in a second range 302. Similarly, reflected light at the third to sixth times may be in third to sixth ranges, respectively. Reflected light at the second time t7 may be in a seventh range 307. Reflected light at the twelfth time t12 may be in a twelfth range 312.

Figure 4:
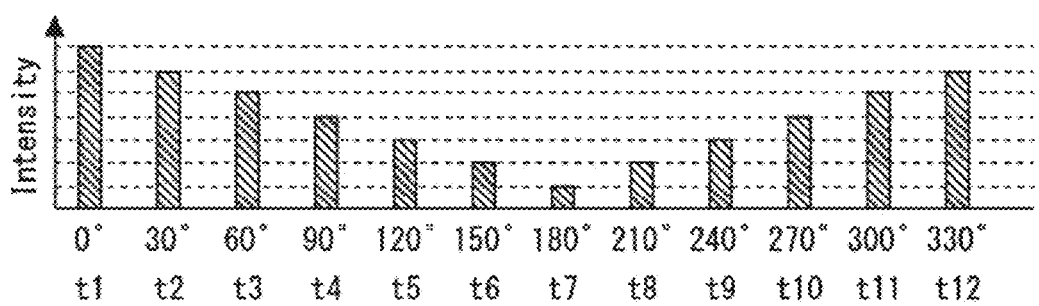
FIG. 4 is a graph showing an example of the intensity of reflected light received by a light receiver.

FIG. 4 is a graph showing an example of the intensity of reflected light received by the light receiver 107.

The light receiver 107 may receive reflected light between the aperture stop 105 and the imaging lens 106. FIG. 4 illustrates the intensity of reflected light received by the light receiver 107. In FIG. 4, the horizontal axis represents the time and the region where the light distribution switching portion 102 distributes light. The vertical axis represents the intensity of the received reflected light.

The controller may calculate a slope direction of a normal line from a change in intensity illustrated in FIG. 4. For example, the controller may set an angle having the lowest intensity as an angle in an oblique direction. In the example of FIG. 4, an angle of about or exactly 180° having the lowest intensity becomes a slope in a normal direction.

Figure 5:
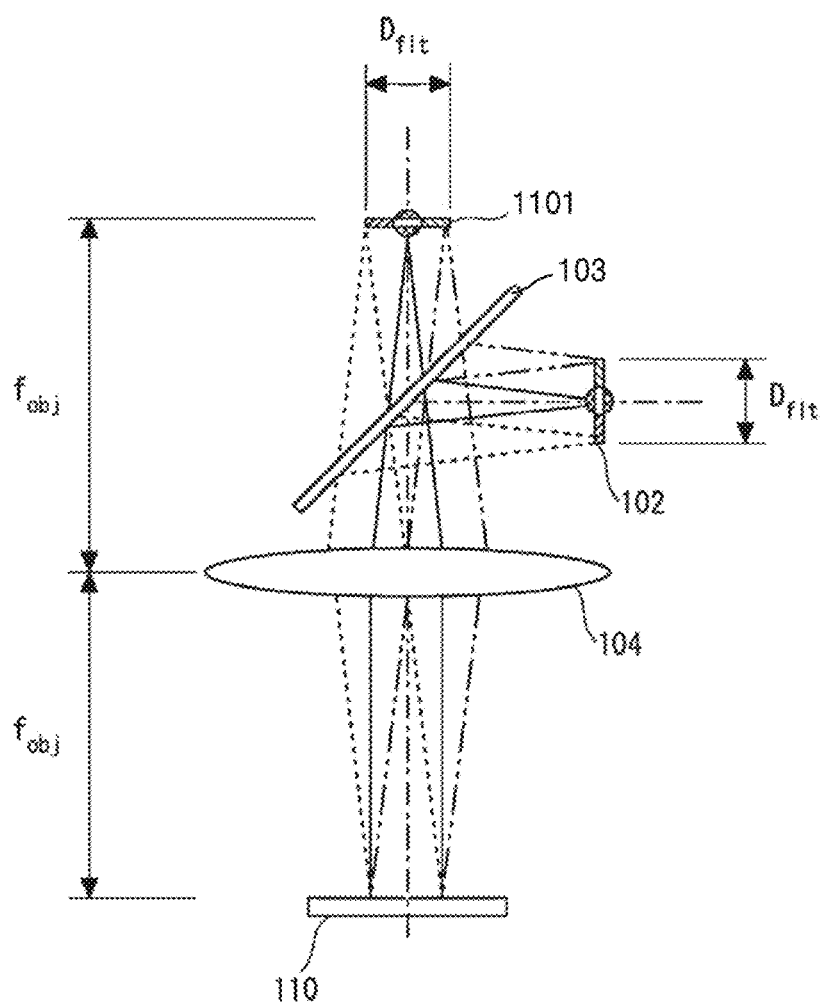
FIG. 5 is a cross-sectional view for describing an optical device according to some example embodiments.
Figure 6:
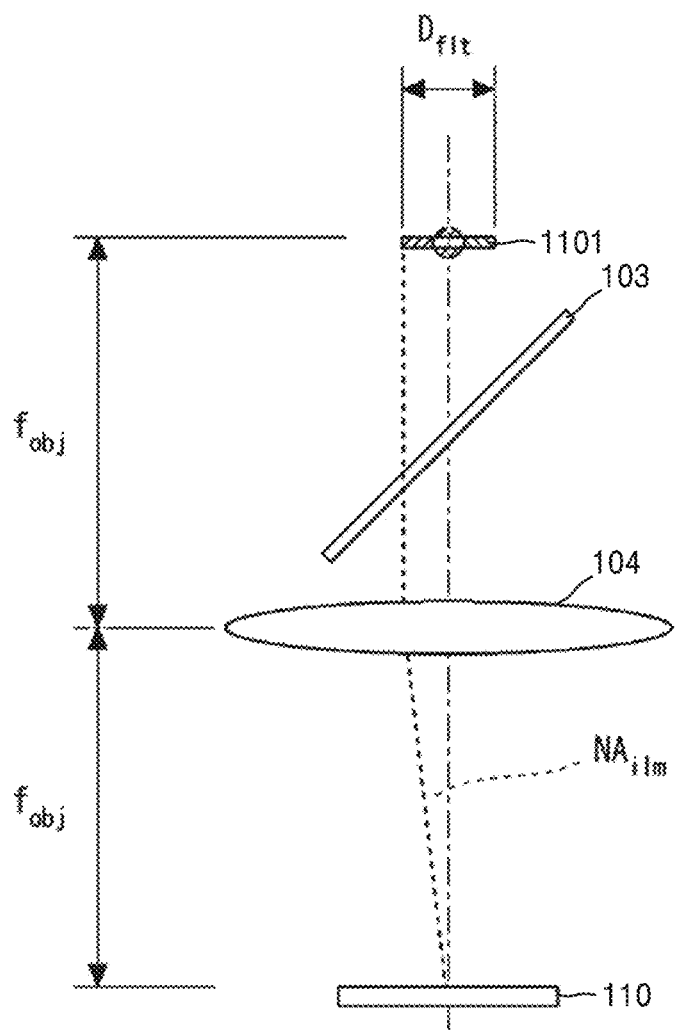
FIG. 6 is a cross-sectional view for describing an optical device according to some example embodiments.

FIGS. 5 and 6 are cross-sectional views for describing the optical device 100 according to some example embodiments.

Referring to FIGS. 5 and 6, a diameter $D_{flt}$ of an effective range in which the light distribution switching portion 102 is capable of switching light distribution is associated with the maximum projection angle of the illumination to each point of the workpiece 110. FIGS. 5 and 6 are cross-sectional views for describing the optical system of the optical device 100 according to some example embodiments. The light arriving from the work piece 110 passes through the objective lens 104, and a light distribution pattern image 1101 may be formed near the focus of the objective lens 104. When a sine value of a half angle of a maximum projection plane is set to $NA_{ilm}$, an approximate relationship of Equation 1 below is obtained.

[Equation 1]

$$D_{flt} \sim 2 f_{obj} NA_{ilm} \tag{1}$$

wherein $f_{obj}$ is the focal length of the objective lens.

Figure 7:
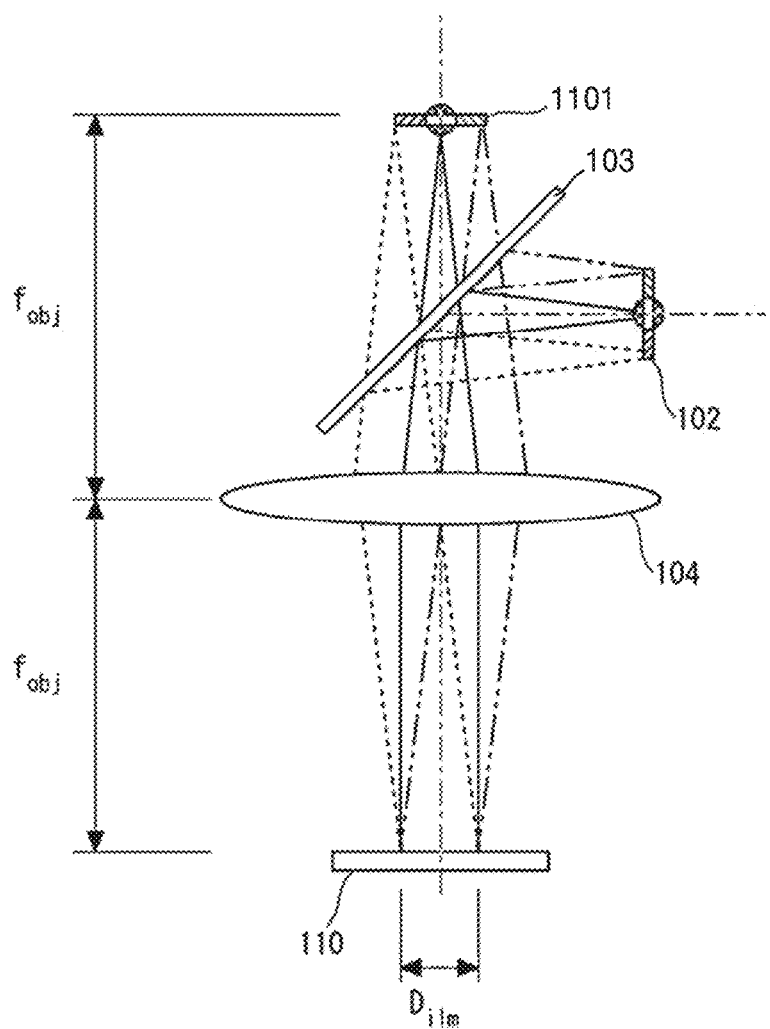
FIG. 7 is a cross-sectional view for describing an optical device according to some example embodiments.
Figure 8:
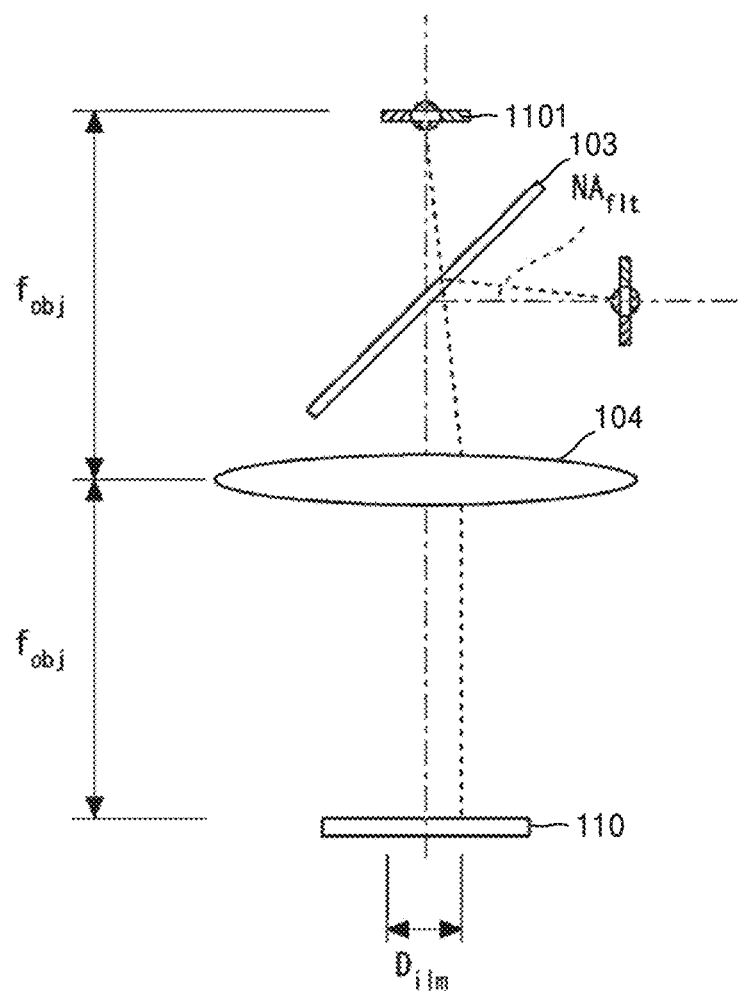
FIG. 8 is a cross-sectional view for describing an optical device according to some example embodiments.

FIGS. 7 and 8 are cross-sectional views for describing the optical device 100 according to some example embodiments.

As illustrated in FIGS. 7 and 8, a divergence angle of light passing through each point of the light distribution switching portion 102 is associated with an illumination range $D_{ilm}$ on the workpiece 110. When $NA_{flt}$ is a sine value of a half angle of a plane of the divergence angle of the light passing through the point on the light distribution switching portion 102, an approximate relationship of Equation 2 below is obtained.

[Equation 2]

$$D_{ilm} \sim 2 f_{obj} NA_{flt} \tag{2}$$

The effective range diameter and the divergence angle of the light distribution switching portion 102 are set so as to obtain a desired illumination range and irradiation angle on the workpiece 110.

Figure 9:
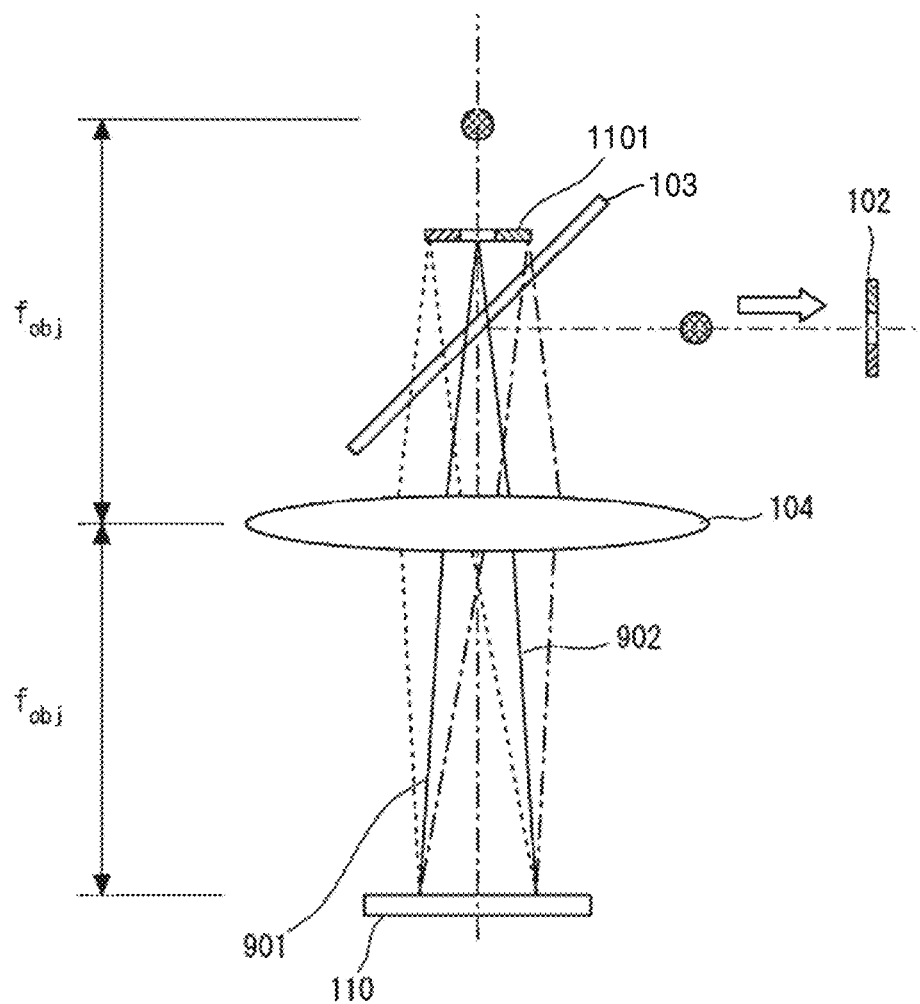
FIG. 9 is a cross-sectional view for describing an optical device according to some example embodiments.
Figure 10:
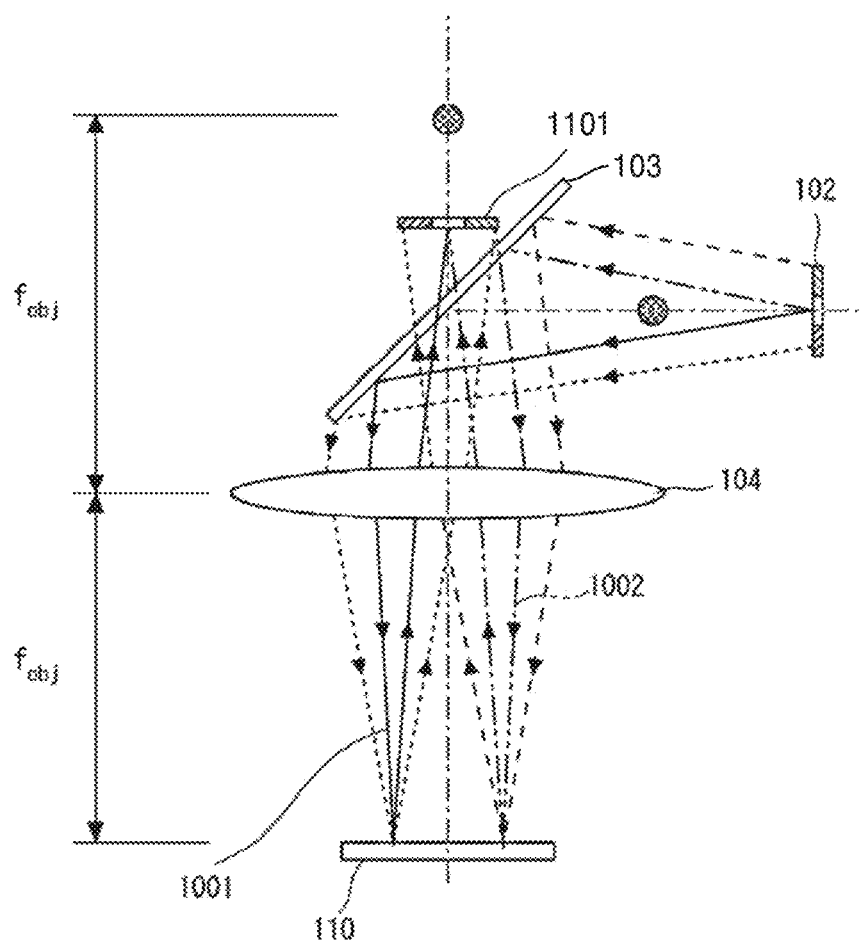
FIG. 10 is a cross-sectional view for describing an optical device according to some example embodiments.

FIGS. 9 and 10 are cross-sectional views for describing the optical device 100 according to some example embodiments. When a first principal ray 1001 and a second principal ray 1002 of the illumination light in FIG. 10 are reflected from the workpiece 110, which is flat and perpendicular to the optical axis, by adjusting the position of the light distribution switching portion 102 back and forth on the optical axis, the angle of the principal ray of the illumination light may be adjusted so as to have a relationship coincident or substantially coincident with a first principal ray 901 and a second principal ray 902 of the observation optical system in FIG. 9.

The light distribution switching portion 102 may be arranged near the front focal point of the objective lens 104. When the telecentricity of the objective lens 104 deviates, the principal ray of the observation optical system and the principal ray of the illumination light may be appropriately set.

Figure 11:
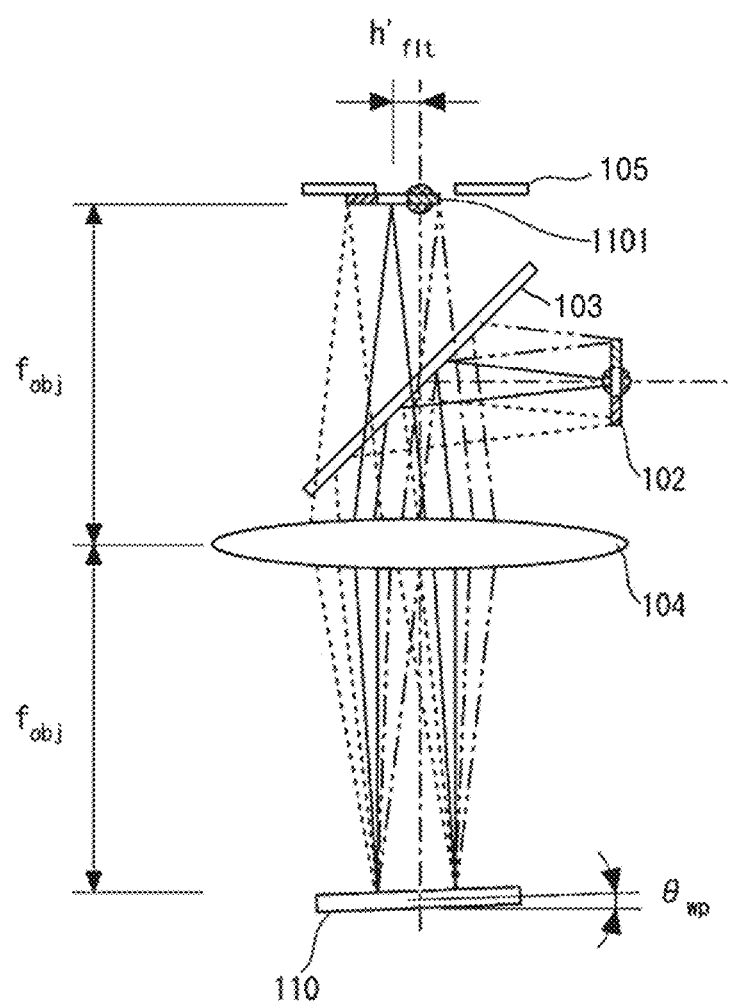
FIG. 11 is a cross-sectional view for describing an optical device according to some example embodiments.
Figure 12:
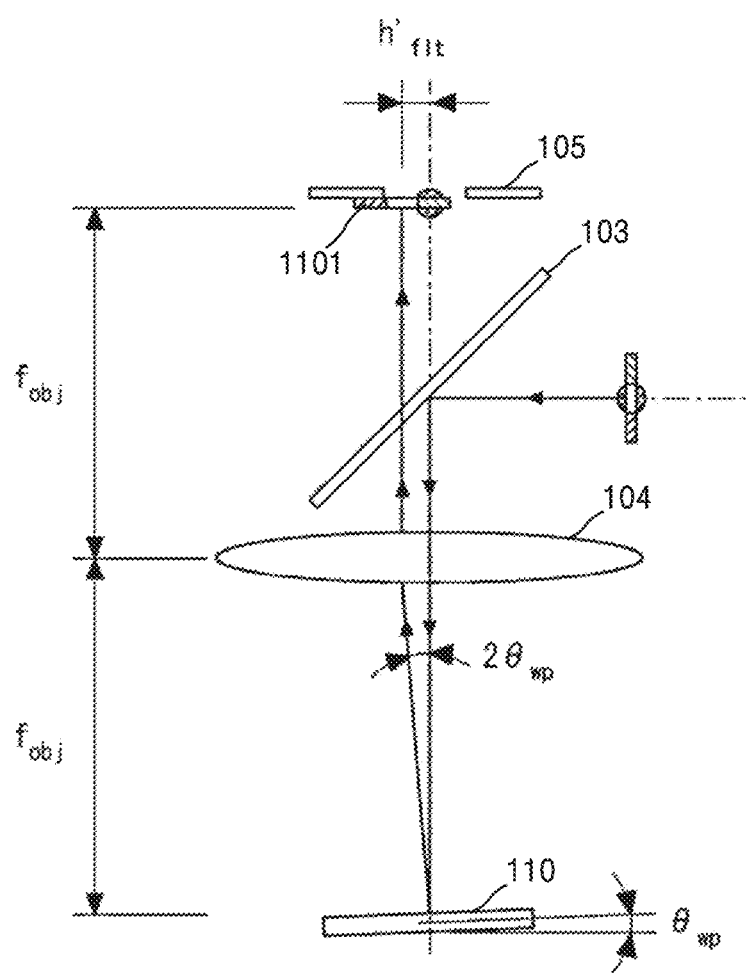
FIG. 12 is a cross-sectional view for describing an optical device according to some example embodiments.

FIGS. 11 and 12 are cross-sectional views for describing the optical device 100 according to some example embodiments.

Referring to FIGS. 11 and 12, light reflected from the workpiece 110 passes through the aperture stop 105 via the objective lens 104. Because the DMD of the light distribution switching portion 102 and the aperture stop 105 have a conjugate or substantially conjugate relationship, an image of a light distribution pattern formed by the DMD may be formed on the surface of the aperture stop 105. When the workpiece surface normal is tilted with respect to the observation optical axis, the image of the light distribution pattern on the aperture stop 105 may move in plane. When the slope angle of the workpiece 110 (the angle formed by the surface normal and the observation optical axis) is $\theta_{wp}$ and the focal length of the objective lens is $f_{obj}$, the shift amount $h'_{flt}$ of the center of the filter image on the aperture stop 105 may be expressed by Equation 3 below.

[Equation 3]

$$h'_{flt} = f_{obj} \tan(2\theta_{wp}) \quad (3)$$

When the diameter $D_{flt}$ of the light distribution pattern is greater than the diameter $D_{apt}$ of the aperture stop 105, the aperture stop 105 may block the light flux of $D > D_{apt}$, and the light flux of $D \geq D_{apt}$ may form an image on the camera. When the slope angle of the workpiece 110 is zero (that is, when the surface normal and the observation optical axis are parallel to each other), $h'_{flt} = 0$ and the center of the light distribution pattern image is on the central optical axis. Therefore, a brightness ratio of an image obtained by switching the light distribution pattern does not change before and after passing through the aperture.

In some example embodiments, when the workpiece 110 is tilted ($\theta_{wp} > 0$), the light distribution pattern image 1101 on the aperture stop 105 may be shifted laterally. Accordingly, the ratio of passing through the aperture stop 105 may change. The light flux may be condensed at a single point on the camera by an imaging lens. As a result, the amount of light received by a pixel having a camera image may change according to the light distribution pattern.

A gradation value ratio detected by a certain pixel on the light receiver 107 may correspond to an area ratio of the divided region on the light distribution pattern passing through the aperture stop 105 on a one-to-one basis, and may correspond to the normal angles ($\theta_{wpx}$ and $\theta_{wpy}$) of the small area on the workpiece 110 having a conjugate relationship with the pixel of the camera of the light receiver 107 on a one-to-one basis.

$\theta_{wpx}$ is the angle with the z axis when the surface normal is projected onto the XZ plane, and $\theta_{wpy}$ is the angle with the z axis when the surface normal is projected onto the YZ plane.

Figure 13:
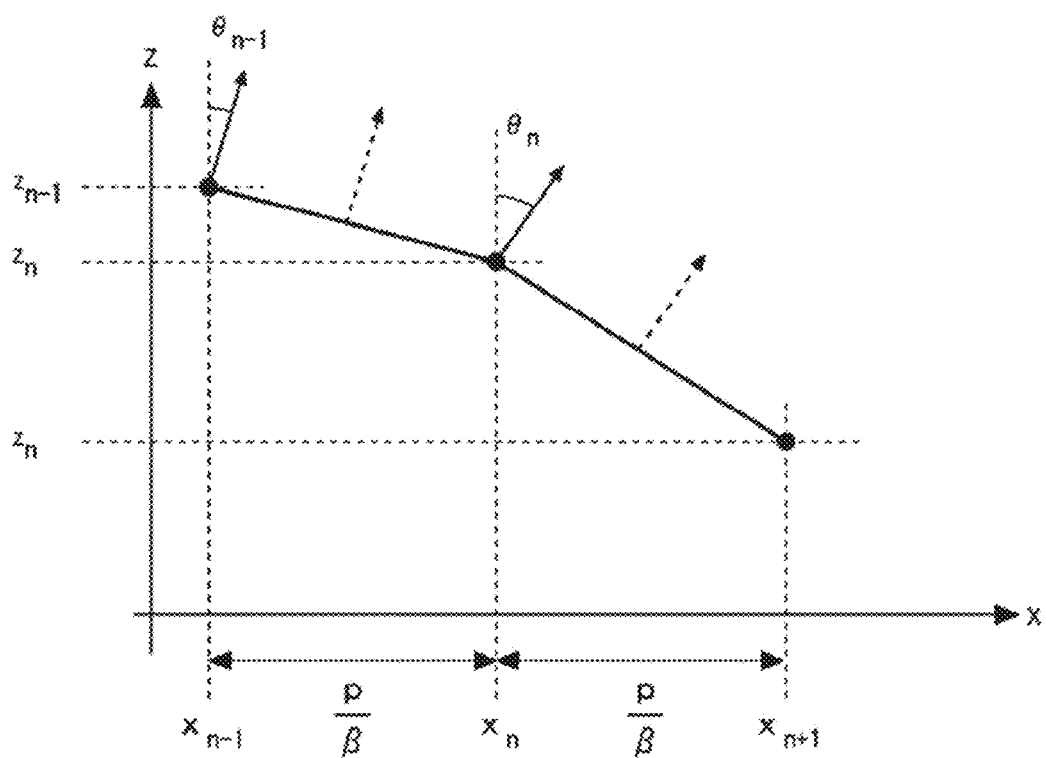
FIG. 13 is a cross-sectional view on an XZ plane in a three-dimensional (3D) shape according to some example embodiments.

FIG. 13 is a graph on the XZ plane in a three-dimensional (3D) shape according to some example embodiments.

When the normal angles ($\theta_{wpx}$ and $\theta_{wpy}$) are obtained for each pixel on the camera, the 3D shape is restored by using the relationship of Equation 4 below.

[Equation 4]

$$Z_{(i,j)} = \frac{1}{2}\left\{Z_{(i-1,j)} - \frac{p}{\beta}\tan\theta_{wpx(i-1,j)} + Z_{(i,j-1)} - \frac{p}{\beta}\tan\theta_{wpy(i,j-1)}\right\} \quad (4)$$

wherein $Z_{(i,j)}$ is the height of the small area on the workpiece 110 corresponding to the pixel of interest, $Z_{(i-1,j)}$ is the height of the small area near the left of the small area of interest, $Z_{(i,j-1)}$ is the height of the small area near the top of the small area of interest, p is the pixel size, $\beta$ is the optical magnification of the observation optical system, $\theta_{wpx}(i-1,j)$ is the normal angle of the small area near the left, and $\theta_{wpy}(i,j-1)$ is the normal angle of the small area near the top.

In the case of inspecting the ideal flat plane that is not tilted, the ratios of the gradation values of the images may be the same as each other. In practice, however, the ratios of the gradation values are not uniform within the field of view due to the accumulation of component manufacturing errors or optical aberrations. Calibration may be performed in advance in order to obtain coefficients for absorbing and correcting these offsets.

First, a flat plate having a uniform reflectance and on which measurement values of the surface shape are obtained with sufficient precision for the size of the 3D shape to be inspected is used as a reference surface. A reference surface is mounted on an inclination stage with sufficient precision, and the slope angle matches the obtained image. A correspondence portion between the slope angle and the obtained image may obtain the relationship between the gradation value ratio and the angle in each pixel and store the relationship as a correspondence table. Alternatively, or additionally, when the relationship is explained by a related function, the relationship may be stored as a coefficient representing characteristics of the function. The calibration method using the flat plate as the reference plane is only an example, and the calibration methods are not limited thereto.

For example, instead of the flat plate, a part having a shape in which the slope angle distribution of the surface normal is already known may be used as a reference, and the corresponding relationship between the gradation value ratio of each pixel and the slope angle distribution when the part is photographed may be used.

When the spectral reflectance of the workpiece 110 is already known and the individual difference or intra-plane gap is small, the reference surface may be made of the same material as that of the inspection object so as to have the same reflectance. When the reflectance of the workpiece 110 is unknown or when the individual differences or gap in in-plane distribution is large, extreme distributions may impact the measurements, for example, to a large degree, and uniform characteristics in a wavelength range may be used.

In the case of inspecting the workpiece 110 which partially includes a plurality of regions each having different spectral reflectance and in which the arrangement of the regions is determined, the received light intensity changes due to the reflectance of the region. Therefore, inspection results may not be obtained due to saturation or lack of light quantity, or a sufficient gradation value ratio may not be obtained, resulting in a decrease in inspection accuracy. In the case of inspecting the workpiece 110, reference planes having characteristics of each region are prepared, and an appropriate amount or illumination light or wavelength according to characteristics of each region is individually obtained. In the case of the inspection, the obtained image may be divided into a plurality of regions with reference to the arrangement information of the regions stored in advance (for example, a pattern diagram when a circuit is drawn with metal on a Si substrate), and the inspection may be performed on each region by applying an appropriate correction value such as light output or light wavelength. Alternatively, the flatness of the entire field of view may be estimated by inspecting only a specific region and interpolating the other regions from inspection results around the region.

In this manner, a surface including a region having a different spectral reflectance may be inspected through the optical device 100 according to some example embodiments. That is, stable inspection results may be obtained without depending on the in-plane reflectance distribution of the workpiece. Because there are no restrictions on the working distance of the observation optical system, the inventive concepts may also be applied to high-magnification optical systems. Because the illumination optical system and the observation optical system are integrally structured, the relative relationship may be firmly maintained and may perform stable measurement even under vibration and shock environments. The light distribution switching portion 102 may change light distribution by arranging the light distribution switching portion 102 near the front focal point of the objective lens. As a result, because an illumination lens is not essential, the number of parts of the optical device may be reduced and the optical device may be made compact.

Figure 14:
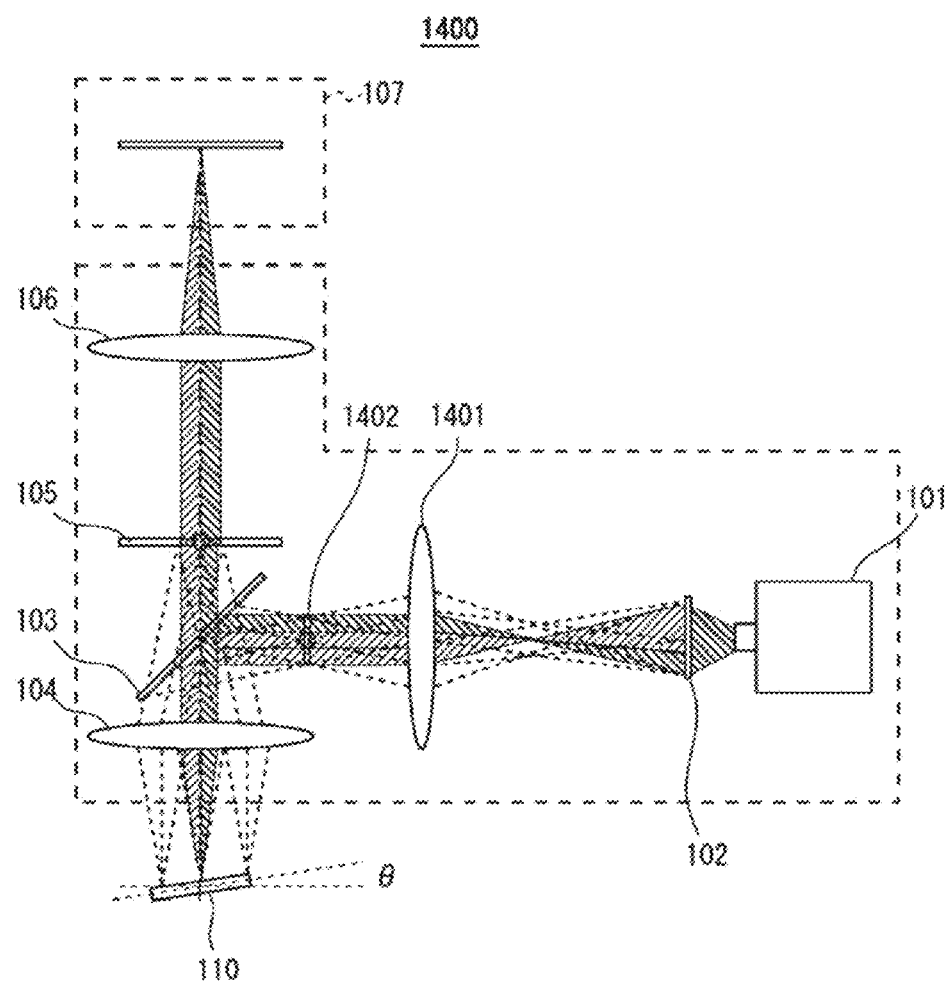
FIG. 14 is a diagram illustrating an optical device according to some example embodiments.

FIG. 14 is a diagram illustrating an optical device 1400 according to some example embodiments.

Referring to FIG. 14, the optical device 1400 according to some example embodiments may arrange an image of a light distribution switching portion 102 formed by an illumination lens. The optical device 1400 may include a monochromatic light source 101, a light distribution switching portion 102, an illumination lens 1401, a half mirror 103, an objective lens 104, an aperture stop 105, an imaging lens 106, a light receiver 107, and a controller (not shown). In FIG. 14, the same components as those in FIG. 1 are denoted by the same reference numerals, and redundant descriptions thereof may be omitted.

The illumination lens 1401 may form an intermediate image 1402 between the illumination lens 1401 and the half mirror 103 by refracting monochromatic light from the light distribution switching portion 102.

Because an image may be formed with an arbitrary magnification through the optical device 1400 according to some example embodiments, there is no need to miniaturize the light distribution switching portion 102 and the degree of freedom in design and manufacturing is improved. In addition, because the size of the surface light source may be reduced by passing through the illumination lens 1401, a commercially available LED spot light source may be applied.

Figure 15:
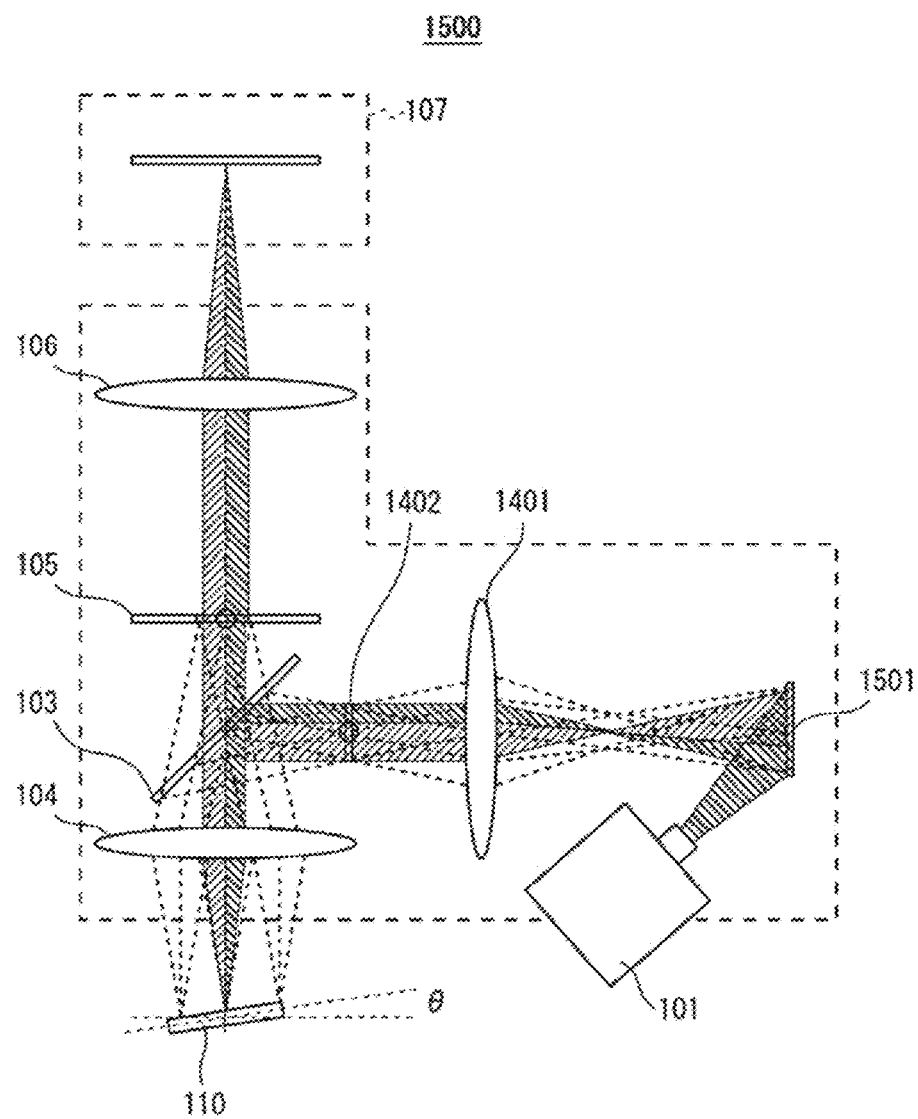
FIG. 15 is a cross-sectional view illustrating an optical device according to some example embodiments.

FIG. 15 is a diagram illustrating an optical device 1500 according to some example embodiments.

Referring to FIG. 15, the light distribution switching portion 102 of the optical device 1500 according to some example embodiments may be a reflective type rather than a transmissive type. The optical device 1500 may include a monochromatic light source 101, a light distribution switching portion 1501, an illumination lens 1401, a half mirror 103, an objective lens 104, an aperture stop 105, an imaging lens 106, a light receiver 107, and a controller (not shown). In FIG. 15, the same components as those in FIG. 1 or 14 are denoted by the same reference numerals, and redundant descriptions thereof may be omitted.

The light distribution switching portion 1501 is a reflective type configuration of the light distribution switching portion 102 described above. Because the plane on which light from the monochromatic light source 101 hits is divided into a plurality of regions, the light distribution switching portion 1501 may switch whether to reflect or block light for each region according to time. The region is obtained by dividing a circle centered on the central optical axis into a fan shape. The light distribution switching portion 1501 may transmit light in each region and may reflect light in the other regions. The light distribution switching portion 1501 may switch a region reflecting light according to time. Incidentally, the light distribution switching portion 1501 may use an LCOS instead of a DMD.

When the DMD is used for the light distribution switching portion 1501, the number of regions of the light distribution pattern may be switched. That is, the area of the fan-shaped region transmitting monochromatic light may be changed.

Because the area of the fan-shaped region transmitting monochromatic light may be changed through the optical device 1500 according to some example embodiments, high-precision inspection (number of divisions: many, number of shots: many) and high-speed inspection (number of divisions: few, number of shots: few) may be selected.

The inventive concepts are not limited to the embodiments described above and may be appropriately modified without departing from the scope of the inventive concept. For example, the monochromatic light source 101 and the light distribution switching portion 102 of the optical device according to some example embodiments may be replaced with a plurality of monochromatic light sources. For example, the optical device may include a plurality of monochromatic light sources that emit light from one of a plurality of fan-shaped regions centered on the central optical axis. The controller may control one of the monochromatic light sources to emit light and change the monochromatic light sources transmitting light without emitting light from the remaining monochromatic light sources over time.

When the terms "about" or "substantially" are used in this specification in connection with a numerical value, it is intended that the associated numerical value includes a manufacturing or operational tolerance (e.g., ±10%) around the stated numerical value. Moreover, when the words "generally" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes.

As described herein, any electronic devices and/or portions thereof according to any of the example embodiments may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, modules, units, controllers, circuits, architectures, and/or portions thereof according to any of the example embodiments, and/or any portions thereof.

As the display device, a liquid crystal panel, an organic electroluminescence (EL) panel, a micro LED array, and the like may be taken into account. In addition, the inventive concepts may also be applied to a projector that projects a light distribution pattern onto a diffusion plate or the like. The number of components of the optical device may be reduced by using a display device in which pixels capable of individually switching light emission, dimming, lights-out, and the like are arranged on a front surface thereof, and the optical device may be made compact.

While the inventive concepts have been particularly shown and described with reference to example embodiments thereof, it will be understood that various changes in form and details may be made therein without departing from the spirit and scope of the following claims.

What is claimed is:

1. An optical device comprising:
   a monochromatic light source;
   a light distribution switching portion configured to transmit monochromatic light emitted from the monochromatic light source in one fan-shaped region among a plurality of fan-shaped regions centered on a central optical axis and block the monochromatic light in other fan-shaped regions of the plurality of fan-shaped regions;
   an objective lens configured to condense the light passing through the light distribution switching portion onto an object;
   an aperture stop configured to collect reflected light from the object;
   an imaging lens configured to condense the reflected light from the object, the reflected light having passed through the aperture stop;
   a light receiver on an imaging plane formed by the imaging lens and configured to receive the reflected light from the object and photoelectrically convert the received reflected light; and
   a controller configured to instruct the light distribution switching portion to change a region transmitting light over time, and calculate a normal direction of the object based on an electrical signal photoelectrically converted by the light receiver.

2. The optical device of claim 1, wherein
   the light distribution switching portion is further configured to
      transmit the monochromatic light emitted from the monochromatic light source in the one of the plurality of fan-shaped regions centered on the central optical axis,
      block light in the other fan-shaped regions of the plurality of fan-shaped regions, and
      change the fan-shaped region transmitting the monochromatic light over time, and
   the controller is further configured to control the light distribution switching portion in which the region transmitting the light is changed over time.

3. The optical device of claim 2, wherein the monochromatic light source and the light distribution switching portion are at a front focal point of the objective lens at a position at which an image of the light distribution switching portion is formed.

4. The optical device of claim 1, wherein
   the monochromatic light source is a plurality of monochromatic light sources, and
   the controller is further configured to control one of the plurality of monochromatic light sources to emit light and simultaneously control other monochromatic light sources not to emit light, and change the monochromatic light source emitting the light over time.

5. The optical device of claim 4, wherein the monochromatic light source is at a front focal point of the objective lens at a position at which an image of the light distribution switching portion is formed.

6. The optical device of claim 1, wherein the controller is further configured to, based on inspecting the object having a plurality of regions having different spectral reflectance characteristics, divide an image captured by the light receiver into a plurality of regions according to arrangement information of the regions, and set at least one of an exposure time, a gain, an illumination light amount, and an illumination wavelength of the light receiver so as to suppress a difference in inspection precision caused by the spectral reflectance characteristics based on the spectral reflectance characteristics for each of the plurality of regions.

7. The optical device of claim 1, wherein the controller is further configured to, based on inspecting the object having a plurality of regions having different spectral reflectance characteristics, divide an image captured by the light receiver into a plurality of regions based on arrangement information of the plurality of regions, perform calculation of a normal angle and restoration of a three-dimensional shape only in a specific region among the plurality of regions, obtain a three-dimensional shape of an entire field of view by interpolating another region among the plurality of regions by a three-dimensional shape around the region, and inspect flatness.

8. The optical device of claim 2, further comprising a half mirror between the objective lens and the imaging lens, wherein the half mirror reflects the monochromatic light arriving from the light distribution switching portion in the direction of the objective lens, and transmits the reflected light arriving from the objective lens in the direction of the aperture stop.

9. The optical device of claim 8, wherein the monochromatic light source is a plurality of monochromatic light sources, and the controller is further configured to control one of the plurality of monochromatic light sources to emit light and simultaneously control other monochromatic light sources not to emit light, and change the monochromatic light source emitting the light over time.

10. The optical device of claim 8, further comprising an illumination lens between the light distribution switching portion and the half mirror,
    wherein the illumination lens form an intermediate image between the illumination lens and the half mirror.

11. An optical device comprising:
    a monochromatic light source;
    a light distribution switching portion configured to reflect monochromatic light emitted from the monochromatic light source in one fan-shaped region among a plurality of fan-shaped regions centered on a central optical axis and transmit the monochromatic light in other fan-shaped regions of the plurality of fan-shaped regions;
    an objective lens configured to condense the light reflected the light distribution switching portion onto an object;
    an aperture stop configured to collect reflected light from the object;
    an imaging lens configured to condense the reflected light from the object, the reflected light having passed through the aperture stop;
    a light receiver on an imaging plane formed by the imaging lens and configured to receive the reflected light from the object and photoelectrically convert the received reflected light; and a controller configured to instruct the light distribution switching portion to change a region reflecting light over time, and calculate a normal direction of the object based on an electrical signal photoelectrically converted by the light receiver.

12. The optical device of claim 11, wherein
the light distribution switching portion is further configured to
reflect the monochromatic light emitted from the monochromatic light source in the one of the plurality of fan-shaped regions centered on the central optical axis,
transmit light in the other fan-shaped regions of the plurality of fan-shaped regions, and
change the fan-shaped region transmitting the monochromatic light over time, and
the controller is further configured to control the light distribution switching portion in which the region reflecting the light is changed over time.

13. The optical device of claim 12, wherein the monochromatic light source and the light distribution switching portion are at a front focal point of the objective lens at a position at which an image of the light distribution switching portion is formed.

14. The optical device of claim 11, wherein
the monochromatic light source is a plurality of monochromatic light sources, and
the controller is further configured to control one of the plurality of monochromatic light sources to emit light and simultaneously control other monochromatic light sources not to emit light, and change the monochromatic light source emitting the light over time.

15. The optical device of claim 11, wherein the controller is further configured to, based on inspecting the object having a plurality of regions having different spectral reflectance characteristics, divide an image captured by the light receiver into a plurality of regions according to arrangement information of the regions, and set at least one of an exposure time, a gain, an illumination light amount, and an illumination wavelength of the light receiver so as to suppress a difference in inspection precision caused by the spectral reflectance characteristics based on the spectral reflectance characteristics for each of the plurality of regions.

16. The optical device of claim 11, wherein the controller is further configured to, based on inspecting the object having a plurality of regions having different spectral reflectance characteristics, divide an image captured by the light receiver into a plurality of regions based on arrangement information of the plurality of regions, perform calculation of a normal angle and restoration of a three-dimensional shape only in a specific region among the plurality of regions, obtain a three-dimensional shape of an entire field of view by interpolating another region among the plurality of regions by a three-dimensional shape around the region, and inspect flatness.

17. The optical device of claim 11, further comprising a half mirror between the objective lens and the imaging lens, wherein the half mirror reflects the monochromatic light arriving from the light distribution switching portion in the direction of the objective lens, and transmits the reflected light arriving from the objective lens in the direction of the aperture stop.

18. The optical device of claim 17, further comprising an illumination lens between the light distribution switching portion and the half mirror, wherein the illumination lens form an intermediate image between the illumination lens and the half mirror.

19. An optical device comprising:
a monochromatic light source;
a light distribution switching portion configured to transmit monochromatic light emitted from the monochromatic light source in one fan-shaped region among a plurality of fan-shaped regions centered on a central optical axis and block the monochromatic light in other fan-shaped regions of the plurality of fan-shaped regions;
an objective lens configured to condense the light passing through the light distribution switching portion onto an object;
an aperture stop configured to collect reflected light from the object;
an imaging lens configured to condense the reflected light from the object, the reflected light having passed through the aperture stop;
a half mirror between the objective lens and the imaging lens;
a light receiver on an imaging plane formed by the imaging lens and configured to receive the reflected light from the object and photoelectrically convert the received reflected light; and
a controller configured to instruct the light distribution switching portion to change a region transmitting light over time, and calculate a normal direction of the object based on an electrical signal photoelectrically converted by the light receiver,
wherein the half mirror reflects the monochromatic light arriving from the light distribution switching portion in the direction of the objective lens, and transmits the reflected light arriving from the objective lens in the direction of the aperture stop,
wherein the monochromatic light source is a plurality of monochromatic light sources,
wherein the light distribution switching portion is further configured to transmit the monochromatic light emitted from the monochromatic light source in the one of the plurality of fan-shaped regions centered on the central optical axis, block light in the other fan-shaped regions of the plurality of fan-shaped regions, and change the fan-shaped region transmitting the monochromatic light over time,
wherein the controller is further configured to control the light distribution switching portion in which the region transmitting the light is changed over time, control one of the plurality of monochromatic light sources to emit light and simultaneously control other monochromatic light sources not to emit light, and change the monochromatic light source emitting the light over time,
wherein the controller is further configured to, based on inspecting the object having a plurality of regions having different spectral reflectance characteristics, divide an image captured by the light receiver into a plurality of regions according to arrangement information of the regions, set at least one of an exposure time, a gain, an illumination light amount, and an illumination wavelength of the light receiver so as to suppress a difference in inspection precision caused by the spectral reflectance characteristics based on the spectral reflectance characteristics for each of the plurality of regions, perform calculation of a normal angle and restoration of a three-dimensional shape only in a specific region among the plurality of regions, obtain a three-dimensional shape of an entire field of view by interpolating another region among the plurality of regions by a three-dimensional shape around the region, and inspect flatness.

20. The optical device of claim 19, further comprising an illumination lens between the light distribution switching portion and the half mirror, wherein the illumination lens form an intermediate image between the illumination lens and the half mirror.

* * * * *